United States Patent [19]

Joannou et al.

[11] Patent Number: 4,685,013
[45] Date of Patent: Aug. 4, 1987

[54] MAGNETIC TAPE HEAD ALIGNMENT SYSTEM

[75] Inventors: Kyriacos Joannou, Wayland; Daniel C. Downs, Framingham, both of Mass.

[73] Assignee: Pericomp Corp., Natick, Mass.

[21] Appl. No.: 768,317

[22] Filed: Aug. 22, 1985

[51] Int. Cl.$^4$ .................. G11B 21/00; G11B 27/36; G11B 21/10
[52] U.S. Cl. .................................. 360/121; 360/25; 360/137
[58] Field of Search ............. 360/25, 76, 77, 121, 360/137, 119; 364/551; 324/210, 212

[56] References Cited

U.S. PATENT DOCUMENTS

| | | | |
|---|---|---|---|
| 2,712,572 | 7/1955 | Roberts | 360/21 |
| 3,938,182 | 2/1976 | McKenna | 360/26 |
| 4,007,493 | 8/1977 | Behr et al. | 360/76 X |
| 4,074,328 | 2/1978 | Hardwick | 360/76 X |
| 4,149,198 | 4/1979 | Behret et al. | 360/76 X |
| 4,163,995 | 8/1979 | Nayland | 360/76 |
| 4,254,440 | 3/1981 | Martin | 360/76 |
| 4,334,252 | 6/1982 | Toriu | 360/121 X |
| 4,347,534 | 8/1982 | Kimura | 360/77 |
| 4,419,700 | 12/1983 | Ragle et al. | 360/77 |
| 4,422,109 | 12/1983 | Sampei et al. | 360/66 X |
| 4,506,309 | 3/1985 | Jonnau et al. | 360/137 |

FOREIGN PATENT DOCUMENTS 0067061 12/1982 European Pat. Off. ............. 360/76

Primary Examiner—Stuart N. Hecker
Assistant Examiner—Alyssa H. Bowler
Attorney, Agent, or Firm—Wolf, Greenfield & Sacks

[57] ABSTRACT

A method of aligning a tape head with the use of a calibration head that is adapted to produce a calibration tape having a pair of spacedly disposed write signals extending substantially normal to the direction of tape travel but at opposite small equal angles to the normal. The calibration tape is passed over the tape head that is to be aligned. The calibration tape is read to detect sequential write signals to determine differences in amplitude therebetween so that the azimuth of the tape head may be adjusted until the detected write signals are of equal amplitude.

10 Claims, 25 Drawing Figures

Fig. 6D  DIY   DIY

Fig. 6K  $IW_I$  WRITE CURRENT PULSE

Fig. 6L  $IW_{II}$  WRITE CURRENT PULSE

MAGNETIC TAPE HEAD ALIGNMENT SYSTEM

BACKGROUND OF THE INVENTION

The present invention relates in general to a system for magnetic tape head alignment. More particularly, the invention pertains to an improved magnetic tape alignment head and associated method of head alignment.

Digital magnetic tape recording and readout equipment is extensively used as a computer peripheral for information interchange with the computer. In order to render the recording medium compatible with different tape drives, the tape drive, such as one handling the standard half inch magnetic tape, must have the capability of recording data at the prevailing data packing density and track spacing with sufficient accuracy. In particular, the recorded data has to be capable of being reliably recorded when the recording medium is read out on equipment other than that on which it was recorded. As packing densities increase, greater performance demands are placed on the equipment used for data recording as well as data readout. Present day commercially available equipment is supposed to be capable of producing recording medium that is compatible throughout the industry. However, the degree of compatibility depends largely on the calibration procedures, the equipment that is used, such as calibration tapes, and the accuracy of measurements of the parameters that are involved.

Many tape-based storage devices and most disc-drive devices have only one signal path for data recovery. In these devices, reliable data recovery requires that the magnetic transducer gap be oriented normal to the path of media travel.

In connection with multi-track magnetic recording/reproducing devices, they typically used a skew tape which is used in the calibration and alignment of a magnetic recording/reproducing head. These heads are typically used on tape drives used in the computer industry for data storage, although they may also be used in connection with any other magnetic recording device. In these multi-channel magnetic storage applications, a high degree of head alignment accuracy is desired in order to maintain the data interchangeability. This is achieved by passing a skew tape under the read head to be aligned. The edge tracks are read as is illustrated hereinafter and the head is adjusted mechanically so that the analog signals of both tracks are superimposed, or in other words, so that the time difference between peaks is zero. The signals of all tracks are thus in phase with those of the edge tracks. This method is accurate and practical in achieving and maintaining data interchangeability in the industry using four, seven, and nine track read/write heads.

In connection with the known form of azimuth alignment, reference is made now to FIGS. 1A-1C. The azimuth alignment of a magnetic recording/reproducing head is a mechanical adjustment. FIG. 1A shows a prior art connection of read amplifiers along with an oscilloscope for displaying the waveforms of the outside tracks showing the skew or time difference between peaks which are being measured. FIG. 1B illustrates the proper position without skew in which all of the peaks align while FIG. 1C shows the signals from the outside tracks such as track 9 in comparison with the reference signal shown in solid as, for example, track 1. In the example that is given, the magnetic tape is considered as being a 9-track tape for use with a 9-track head. In FIG. 1C, the track is represented by dotted lines in different waveforms spread on both sides of the perpendicular $X_0$. FIG. 1C illustrates the dynamic skew or jitter of the outside track about the reference which is to be measured with accuracy in order to align the head accurately. Visually, the extreme position of the positive peaks of the waveform are located at $(+x)$ and $(-x)$. These values can be added algebraically to obtain the average position of the head or average skew.

In addition to multi-channel, multi-head systems, single track or serial storage devices have now become more extensive in use and require a different procedure because no other channel exists with which to make a phase comparison. In this connection, in these single head systems, high track densities are achieved by stepping either a single or double read/write track head across the width of the tape. Whether a single or double track head is used, only one read and one write amplifier is available in such systems. Therefore, the method used with a standard 4, 7, or 9-track format for achieving azimuth alignment is not usable. However, the requirement for data interchangeability remains. Stated in another way, the convenience of reading two signals and adjusting for zero time difference between pulses or peaks of the two signals, is no longer available with the use of the single read/write amplifier arrangement.

The technique that is presently used to azimuth align a read head is to pass a tape under the single read track head and rotate the head clockwise and counter clockwise until the position is found where maximum output is obtained. The head is then secured. This method has drawbacks associated therewith. It requires that the skew tape be recorded with very high frequency signals in order to achieve acceptable tolerances. However, a skew tape recorded with these high frequencies is much more difficult to manufacture and test. Also, once the head position of maximum output is found, an error can be made quite easily when one attempts to secure the head with a screwdriver or other mechanical tool. This is apt to cause a change in the position, thus requiring recalibration.

Accordingly, it is an object of the present invention to provide an improved system for tape head alignment.

A further object of the present invention is to provide an improved system in accordance with the preceding object and which is particularly adapted for head alignment in a system employing a single movable tape head.

SUMMARY OF THE INVENTION

To accomplish the foregoing and other objects, features and advantages of the invention, there is provided a method of magnetic tape head alignment, particularly adapted for single track heads. In accordance with the method of the invention, there is provided a calibration tape having a pair of spacedly disposed write signals extending substantially normal to the direction of tape travel but at opposite small equal angles to the normal. These pairs of linear write signals on the calibration tape are disposed in a fixed repeatable sequence. The calibration tape is passed over the tape head that is being aligned and the calibration tape is read so as to detect the sequential write signals to determine differences in amplitude therebetween. The writing of the signals on the calibration tape may be carried out by means of two separately disposed write heads, or alternatively a single gap write head may be employed along with suitable control triggering so as to provide the pair of write signals with opposite but equal skew equal to the normal. In accordance with the method of alignment, there is also preferably included the step of adjusting the azimuth of the tape head until the detected write signals are of equal amplitude.

In accordance with the invention, there is also provided a magnetic tape calibration head for producing a test or calibration tape. This head comprises a first write head having a linear head gap extending in a first direction and a second write head having a linear head gap extending in a second direction. The first and second write heads are supported in adjacent position. There is also provided a multi-track read head disposed adjacent one of the write heads and extending normal to the tape travel access direction. This read head may be used for the purpose of aligning the calibration head for the purpose of providing a proper calibration tape. In this connection, the first and second write heads are positioned so that their head gaps converge and both extend at the same small angle to the normal. The calibration head operates on the principle of wavelengths approaching gap length becoming attenuated if recovered at small angles other than normal to the gap width of the written signal.

BRIEF DESCRIPTION OF THE DRAWINGS

Numerous other objects, features and advantages of the invention should now become apparent upon a reading of the following detailed description taken in conjunction with the accompanying drawings, in which:

FIGS. 6A–6L illustrate a series of waveforms associated with the circuit of FIG. 5.

DETAILED DESCRIPTION

In accordance with the present invention there is provided a single track skew method for essentially quantitatively measuring the angle between the trailing edge of a magnetic transducer gap and the direction of media travel. The very general principle that is employed has to do with the wavelengths approaching gap length becoming attenuated if recovered at minute angles other than normal to the gap width of the written signal. In this connection a special signal on a calibration tape is written in doublets, the first pulse at twice the negative skew tolerance and a second at twice the positive skew tolerance. As these doublets are read by the device to be calibrated, the relative amplitudes of the recovered pulses indicate gap skew. Equal amplitudes, even though they are attenuated, indicate the zero skew. In the technique of the present invention, only one signal recovery channel is needed for proper alignment. In addition, since the doublets may be written at any chosen rate and spacing, one low cost A/D channel may be used for accurate "hand free" measurement.

Figure 1A:
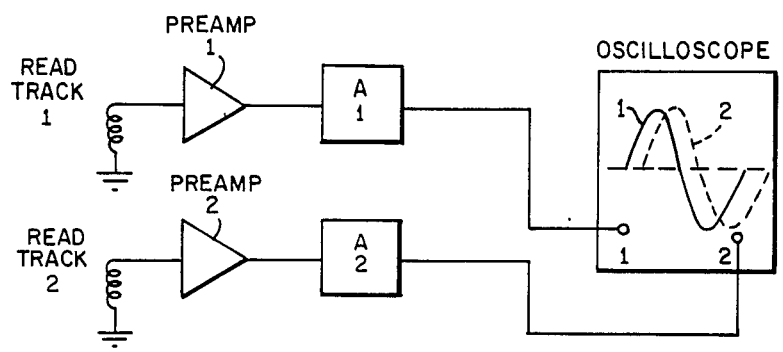
FIGS. 1A–1C illustrate prior art azimuth alignment techniques
Figure 1B:
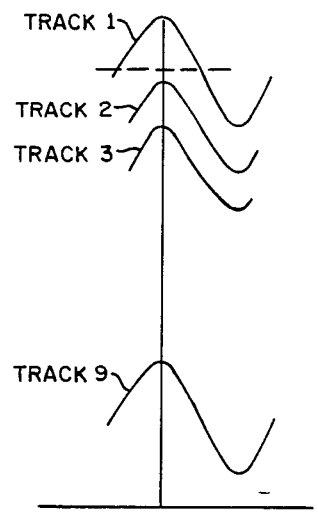
Figure 1C:
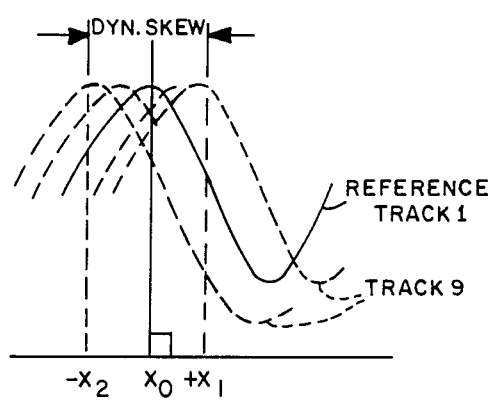
Figure 2A:
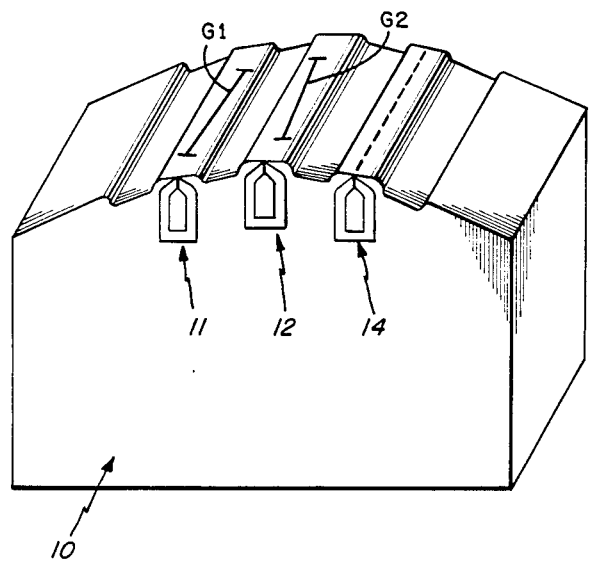
FIG. 2A is a perspective view of a magnetic tape calibration head constructed in accordance with the principles of the present invention.
Figure 2B:
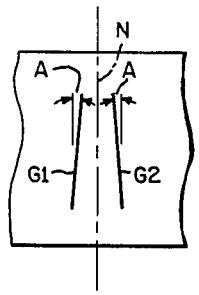
FIG. 2B is a plan view of the tape calibration head of FIG. 2A.

There are many methods by which these doublets can be written on the calibration tape. In order to write the doublets in a single passage of the media, two write gaps are required. With this configuration, as illustrated in FIGS. 2A and 2B, write flux across each of the gaps is on only during the short time taken to write the respective half of the doublet. This is referred to as "return to zero" recording. If the gaps are spaced along the direction of media travel at an interval greater than that desired for recovery, one mates the Nth pulse of the negative skew with the first pulse of the positive skew to form a doublet. In this instance the quantity N may be determined from spacing, media velocity, and desired interval.

As indicated previously, in a preferred embodiment as illustrated herein, the write signals are recorded by means of a pair of write heads. However, in an alternate arrangement, the doublets (pair of write signals) may be written with a single write gap using a suitable trigger. On disc drive storage devices, the index may be used. However, care must be taken in closing the interval and spacing of the doublets. The rotational velocity variations combined with optical trigger uncertainty may cause the pulses to overlap. At any rate, the skew of the right gap has to be changed between the first and second passes of the tape when using a single write gap. A delay trigger, reading the first pulse, waiting and writing the second provides a more reliable method. In such a case, the index is used only to enable and disable the write trigger.

FIGS. 2A and 2B show the details of a preferred form of magnetic tape calibration head in accordance with the present invention. The calibration head 10 is comprised of three separate heads including a first write head 11, a second write head 12, and a nine track read head 14. FIG. 2A illustrates the write head 11 as having a gap G1 and a write head 12 as having a gap G2.

The write head gaps G1 and G2 extend substantially normal to the direction of tape travel. In this regard, refer to FIG. 2B and the normal direction as indicated by the line N. It is noted that the gaps G1 and G2 are at a small angle to the normal and that they are disposed in a converging manner with the same but opposite small angle to the normal. The write gaps of the two recording heads may be spaced by a distance less than 0.5" preferably in the range of 0.2" to 0.4". These write gaps are of equal but opposite angle, preferably on the order of 15–30 minutes of arc from the azimuth or normal line N. The read head 14 is spaced a distance from the write heads 11 and 12. In this connection, FIG. 2A shows the general placement of all three heads.

The read head 14 is used primarily for alignment of the head 10 with the calibration tape. In constructing the calibration tape with the write gap signals that are periodically repeated, one has to be assured that the written signals are in fact symmetrical about a line normal to the direction of tape travel. In this regard, the read heads can read the just written signals from the tape and ascertain whether the gaps G1 and G2 are at the proper equal angle to the normal. Adjustment of the overall test head 10 may have to be made in order to provide the proper written test patterns on the calibration tape. Once the calibration tape is completed with the repetitive pairs of signals or doublets as previously referred to, then the calibration tape is used in carrying out the adjustment of the tape head that is to be calibrated. In this regard, reference is now made to FIGS. 3 and 4.

Figure 3A:
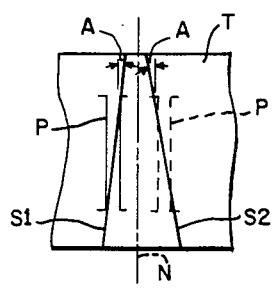
FIGS. 3A–3C illustrate different azimuth positions for the magnetic tape head that is being calibrated.
Figure 3B:
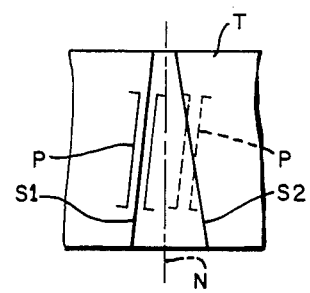
Figure 3C:
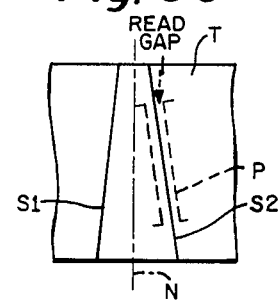
Figure 4A:
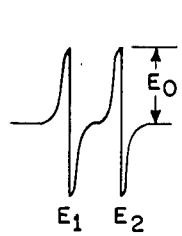
FIGS. 4A–4C relate to FIGS. 3A–3C and show waveforms that are read from the tape corresponding to the different azimuth positions of the head that is being calibrated.
Figure 4B:
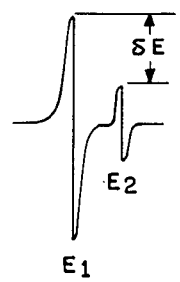

FIGS. 3A-3C illustrate a series of different interrelationships between the single track head and the recorded signals. FIGS. 4A-4B are signals that correspond to the different azimuth positions illustrated in FIGS. 3A-3C, respectively.

In FIGS. 3A-3C, there is illustrated the recorded signals S1 and S2. It is noted that each of these signals has been recorded on the tape T at a small angle A to the normal line N. In FIGS. 3A-3C, the skew of the signals S1 and S2 is somewhat exaggerated to describe the concepts of the invention. As indicated previously, the angle A may be on the order of 15-30 minutes.

With specific reference to FIG. 3A, it is noted that there is illustrated therein the pole piece P of the read/write head that is being calibrated. The pole piece P is shown in solid in relationship to the recorded signal S1 and is shown in dotted in relationship to the recorded signal S2. The read/write head is of course stationary and the tape T is moving in a direction orthogonal to the line N. Thus, the tape is shown at a first position when the pole piece P essentially aligns with the midpoint of the recorded signal S1 and then is later shown at a time displaced instance with the pole piece P being aligned with essentially the mid-point of the recorded signal S2. Now, reference is also made in this regard to FIG. 4A which shows the waveform that is read by the read/write head as the tape passes and as the recorded signals are detected. The position illustrated in FIGS. 3A and 4A is one in which the head is in proper alignment and thus it is noted that the amplitudes of the signals E1 and E2 are equal. Thus, equal amplitudes, although each amplitude is somewhat attenuated, indicates a zero skew and proper alignment of the read/write head. In other words, the read gap is at 90° with respect to the direction of tape travel.

It is noted in FIG. 3A that because the pole piece P is not in parallel alignment with either of the signals S1 or S2, there is an attenuation in the maximum signal that may be read. Thus, the amplitude E0 in FIG. 4A is not a maximum amplitude as would be possible in the case where the pole piece aligned more in parallel with the recorded signals.

Now, reference is made to FIG. 3B and the associated waveform of FIG. 4B. The pole piece P in FIG. 3B is out of alignment with regard to the proper alignment along the normal line N. In the instance of FIGS. 3B and 4B, the pole piece P is parallel to the signal S1 and at the instance of time illustrated in FIG. 3B, there is a maximum peak of the signal as indicated by the amplitude peak E1 in FIG. 4B. Now, as the tape moves and the pole piece aligns with the recorded signal S2 as indicated in dotted outline by the pole piece P, then there is a more substantial out-of-alignment relationship between the pole piece and the signal S2 and thus the amplitude E2 is substantially decreased to a point where it is even less than the amplitude E2 illustrated in FIG. 4. This occurs because the angle between the pole piece and the signal S2 has increased over the angle therebetween illustrated in FIG. 3A. In the example illustrated in FIGS. 3B and 4B, the difference in amplitude between the signals E1 and E2 may be represented by the following equation, $E1 = 3E2$.

Figure 4C:
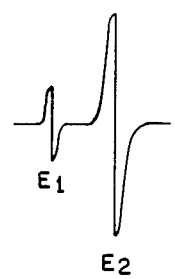

FIG. 3B has illustrated the out-of-alignment skew of the read/write head in one direction. FIG. 3C now illustrates the out-of-alignment position of the pole piece in opposite direction of skew. In FIG. 3C the pole piece P is only illustrated in solid and is shown in parallel alignment with the recorded signal S2. Again, in this instance, the read/write head when reading the signal S1 will have a substantially lower amplitude read signal because the out-of-parallel alignment between the pole piece and the signal S1. In this regard, reference is made to FIG. 4C which shows the lower amplitude signal E1 associated with a reading by the pole piece P of the signal S1. FIG. 4 also illustrates the higher amplitude signal E2 which is representative of a reading of the signal by the pole piece P from the recorded signal S2. In the instance of FIG. 3C, the read gap associated with pole piece P is parallel to the signal S2. The interrelationship between the amplitudes E1 and E2 in FIG. 4 is represented by the following equation, $E2 = 3E1$.

In FIGS. 4A-4C there have been illustrated only three specific examples of the manner in which the signals E1 and E2 fluctuate. For different skew angles of the pole piece to the normal, the signals E1 and E2 will have different amplitude interrelationships. However, it is only at the parallel position to the normal line N that the amplitudes E1 and E2 are equal. Also, it is only at that position that the read/write head is in proper alignment.

There has now been described a technique by which head alignment is carried out by virtue of adjusting the read/write head until the calibration signals are of equal amplitude. In an alternate technique that may be practiced to provide substantially the same results, the maximum amplitude signal such as the signal E1 in FIG. 4B by way of example, may be maximized by adjustment of the head. By additionally having knowledge of the angle from normal of the calibrating write head, one can then move the head to be calibrated, after the maximum amplitude position is attained, through a fixed angle corresponding to the angle to the normal of the calibrating write head. This should also arrive at the proper alignment position.

Figure 5:
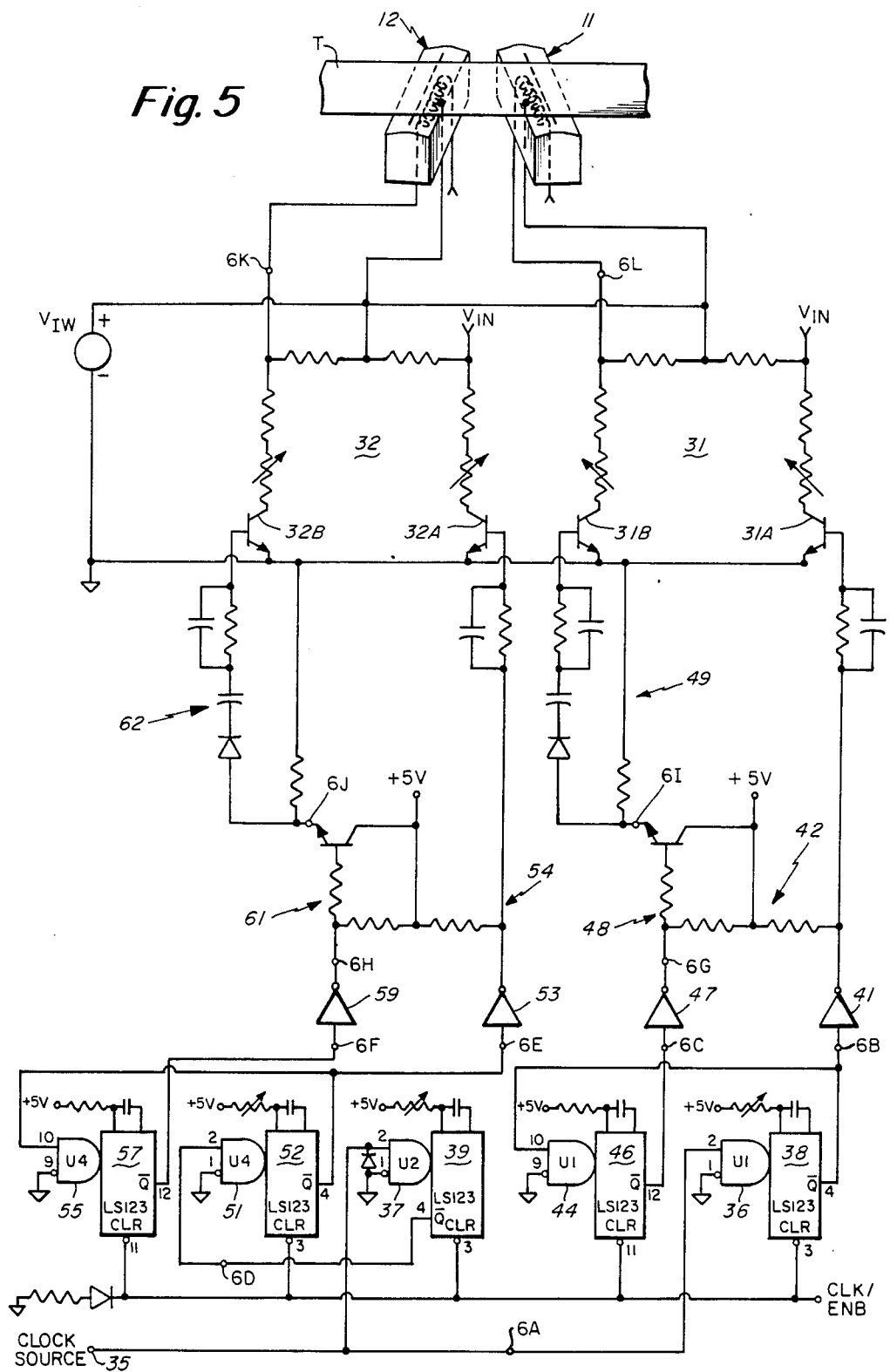
FIG. 5 is a diagram of a preferred circuit used with the calibration or alignment technique of the present invention.

Reference is now made to FIG. 5 which is a circuit diagram illustrating the manner in which the recorded signals of equal and opposite skew (the doublets) are recorded on the calibration tape T. In this regard, note the write head 11 and the write head 12. The write head 11 is associated with a bistable driver 31 while the write head 12 is associated with a bistable driver 32. The driver 31 comprises transistors 31A and 31B while the driver 32 comprises transistors 32A and 32B. Note in FIG. 5 the four control lines that couple to these respective transistors for control thereof.

In FIG. 5 at the input of the circuit, there is provided a clock signal coupled to the terminal 35. This clock signal couples to the gates 36 and 37 where the gate 36 is for driving a first one-shot 38 while the gate 37 is for driving a second one-shot 39. It is noted that the output of the one-shot 38 at its negation output couples by way of inverter 41 and circuit 42 to the base of transistor 31A.

The negation output of the one-shot 38 also couples to the gate 44. The gate 44 drives a further one-shot 46. The negation output of one-shot 46 couples by way of an inverter 47 and circuits 48 and 49 to the base of the transistor 31B. The one-shot 46 provides a predetermined delay so that there is a delay between the signals coupled to transistors 31A and 31B, respectively.

In connection with the one-shot 39, it is noted that its negation output couples to the gate 51. The gates 51 drives the one-shot 52 and at its negation output, there is a coupling by way of the inverter 53 and the circuit 54 to the base of transistor 32A. The negation output from the one-shot 52 also couples to the gate 55. The gate 55 drives the one-shot 57. The negation output of the one-shot 57 couples by way of the inverter 59 and circuits 61 and 62 to the base of transistor 32B. The one-shot 57 provides a predetermined delay so that the proper delayed signals are provided to the base of the transistors 32A and 32B, respectively. It is also noted that there is an additional delay provided by the one-shot 39 so that there is a delay between the excitation of the respective write heads 11 and 12.

Reference is now made to FIG. 6 which illustrates a series of waveforms specifically in FIGS. 6A-6L associated with different points in the circuit of FIG. 5. In connection with identifying the places in the circuit where these waveforms are taken, it is noted that in FIG. 5, the designations 6A-6L correspond to the waveforms 6A-6L of FIG. 6. Thus, for example, the waveform in FIG. 6B is taken at the output of the one-shot 38 and the waveform in FIG. 6G is taken at the output of the inverter 47. All other locations on the circuit are identified with reference numbers that correspond to the waveforms in FIGS. 6A-6L.

Figure 7:
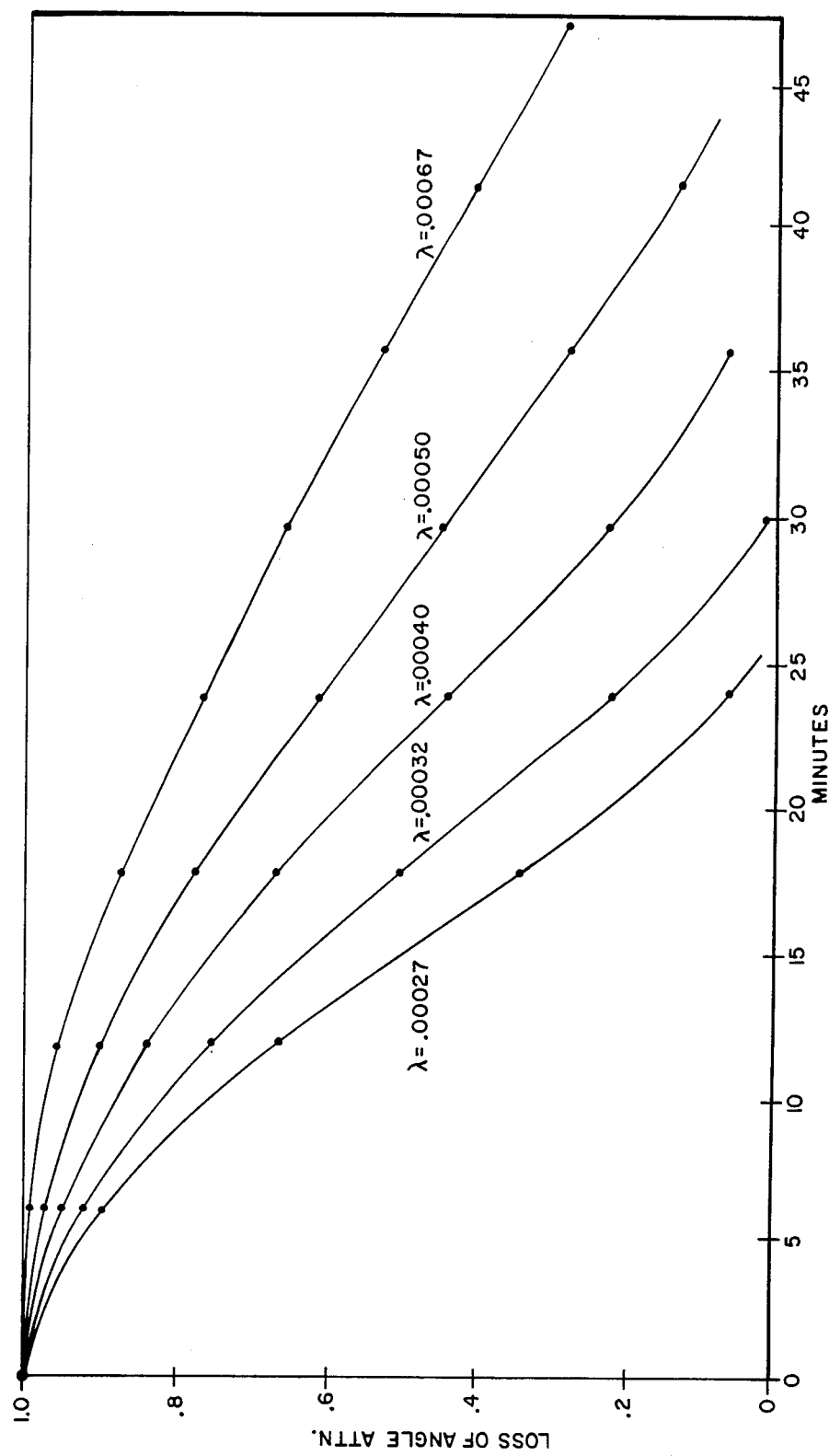
FIG. 7 is a graph illustrating loss of angle attenuation as it relates to the present invention.

Reference is also made to the graph of FIG. 7 which is a graph of loss of angle attenuation showing normalized outputs on one axis and angle in minutes on the other axis. There are families of waveforms corresponding to the different wavelengths as noted in FIG. 7.

With regard to the techniques of the present invention, and in particular with reference to FIGS. 3A-3C and the associated waveforms of FIG. 4A-4C, it is noted that the correct alignment occurs as indicated in FIGS. 3A and 4A when there are equal amplitude pulses, or in other words, when the signal E1 is equal to the signal E2. The other two examples given in FIGS. 3B and 3C are out of skew indications. For example, in FIG. 3B, one of the signals is at a maximum which indicates that the head that is being aligned is out of skew by an amount equal to the skew of the calibrating write head. Thus, there can actually be associated with the waveform 4B a particular skew angle. There may also be interpolated, other skew angles between the waveforms of FIGS. 4A and 4B corresponding to different skew angles. This interpolation is for the most part on a linear basis and if one desires, one can thus calculate the actual skew angle.

Having now described a preferred embodiment of the present invention and some modification thereof, it is contemplated that numerous other embodiments and modifications thereof may be contemplated as falling within the scope of the present invention as to be defined by the appended claims.

What is claimed is:

1. A magnetic tape calibration head for producing a test tape and comprising;
   a first write head having a linear head gap extending in a first direction,
   a second write head having a linear head gap extending in a second direction,
   said first and second write heads being supported in adjacent position,
   a multi-track read head disposed adjacent one of said write heads and extending normal to the tape travel axis direction,
   said first and second write heads positioned so that their head gaps converge and both extend at a small angle to the normal,
   both said first and second write heads being single gap heads, the length of said write head gaps each being substantially equal to the length of the multi-track read head.

2. A magnetic tape calibration head as set forth in claim 1 wherein the write gaps are separated by a spacing of less than 0.5 inch.

3. A magnetic tape calibration head as set forth in claim 2 wherein the write gap spacing is in the range of 0.2 to 0.4 inch.

4. A magnetic tape calibration head as set forth in claim 1 wherein said small angle is in the range of 15'-30'.

5. A magnetic tape calibration head as set forth in claim 1 including means for integrally supporting the write heads and read head.

6. A magnetic tape calibration head as set forth in claim 1 wherein the single gap write heads each extend substantially across the full tape width.

7. A magnetic tape calibration head for producing a test tape in a system employing a single movable tape head and comprising; a first write head having a linear head gap extending in a first direction, a second write head having a linear head gap extending in a second direction, means supporting the first and second write heads in close adjacent position, said means for supporting adapted to dispose the first and second write heads so that their head gaps converge and both extend at a small angle to the normal to the tape travel access direction, both said write head gaps extending substantially across the full tape width, and a multi-track read head, adjacent one of said write heads and extending normal to the tape travel axis direction and wherein both said write heads are single gap write heads with the length of said write head gaps each being substantially equal to the length of the multi-track read head.

8. A magnetic tape calibration head as set forth in claim 7 wherein the write gap spacing is on the order of 0.2 to 0.4 inch.

9. A magnetic tape calibration head as set forth in claim 7 wherein the write gaps are separated by a spacing of less than 0.5 inch.

10. A magnetic tape calibration head for producing a test tape in a system employing a single moveable tape head and comprising; a first write head having a linear head gap extending in a first direction, a second write head having a linear head gap extending in a second direction, means supporting the first and second write heads in close adjacent posiition, said means for supporting adapted to dispose the first and second write heads so that their head gaps converge and both extend at a small angle to the normal to the tape travel access direction, both said write head gaps extending substantially across the full tape width, wherein said small angel is in the range on the order of 15-min.-30-min.

* * * * *